United States Patent [19]

Augustyn

[11] Patent Number: 4,748,015

[45] Date of Patent: May 31, 1988

[54] METHOD OF COMPLEX PRODUCTION OF SODIUM BIFLUORIDE, ACTIVE SODIUM FLUORIDE, HYDROGEN FLUORIDE AND POTASSIUM NITRATE

[76] Inventor: Wladyslaw Augustyn, 90 LaSalle Rd., New Britain, Conn. 06051

[21] Appl. No.: 917,796

[22] Filed: Oct. 10, 1986

[51] Int. Cl.$^4$ ................................................. C01D 3/02
[52] U.S. Cl. ....................................... 423/472; 423/483
[58] Field of Search ................ 423/472, 490, 483, 398

[56]  References Cited

U.S. PATENT DOCUMENTS 3,897,506  7/1975  Yang et al. ........................... 423/483
4,089,936  5/1978  Thompson et al. .................. 423/483

FOREIGN PATENT DOCUMENTS 161,699    4/1964  USSR ..................................... 423/472

OTHER PUBLICATIONS

Yang, Kang, "Freon", Chemical Abstract, vol. 83:147114n, 1975.
Bunghez et al., "Sodium Bifluride", Chemical Abstract, vol. 101:9568c, 1984.

Primary Examiner—John Doll
Assistant Examiner—Adriana L. Mui
Attorney, Agent, or Firm—McCormick, Paulding & Huber

[57]  ABSTRACT

A complex method was developed for the conversion of an ammonium fluoride solution and an ammonium fluoride/potassium fluoride solution into sodium bifluoride, active sodium fluoride and hydrogen fluoride, with potassium nitrate as a co-product and a concentrated solution of ammonium nitrate as a by-product. Quickly settling crystals of sodium bifluoride containing a very small amount of water after centrifugation are obtained with high efficiency from the reaction which occurs during the mixing of a concentrated solution of sodium fluoride in aqueous nitric acid with the ammonium fluoride solution. The by-product of the reaction is a very concentrated solution of ammonium nitrate. Potassium nitrate is precipitated from the ammonium fluoride/potassium fluoride solution after the addition of ammonium nitrate and after cooling. The mother solution formed in the crystalization is applied to the precipitation of sodium bifluoride. The production of hydrogen fluoride and active sodium fluoride takes advantage of the technically known thermal decomposition of sodium bifluoride as obtained according to the invention. Active sodium fluoride and hydrogen fluoride can be produced in different ratios, since either product of the thermal decomposition of sodium bifluoride may be partially applied to the precipitation of additional sodium bifluoride.

14 Claims, No Drawings 4,748,015

METHOD OF COMPLEX PRODUCTION OF SODIUM BIFLUORIDE, ACTIVE SODIUM FLUORIDE, HYDROGEN FLUORIDE AND POTASSIUM NITRATE

SUMMARY OF THE INVENTION

The subject of this invention is a complex method for producing sodium bifluoride, active sodium fluoride, hydrogen fluoride and potassium nitrate from fluorine compounds obtained as by-products in the phosphorous fertilizer industry.

The complex method takes advantage of two concentrated solutions, one containing ammonium fluoride and the other containing potassium fluoride and ammonium fluoride. Both solutions can be easily obtained by ammoniacal hydrolysis from proper silicofluorine compounds. Besides these two solutions, sodium fluoride of different origins can also be applied as an additional fluorine material. Other raw materials used in this complex method are: nitric acid, preferably about 70% and soda preferably as sodium carbonate.

To secure very high purity of all products, it is desirable that silicium compounds be removed from both fluoride solutions. This can be realized in a simple way by the precipitation of potassium silicofluoride which forms as quickly settling crystals.

The ammonium fluoride solution can be obtained in the hydrolysis with an easily reachable concentration of about 12 equivalents per 1 kg of water and can be directly applied in the complex method. The solution containing potassium fluoride and ammonium fluoride leaves the hydrolytic system, however, with only about 7 equivalents of fluorine per 1 kg of water and should be concentrated by evaporation before introduction into the process.

The most important part of this complex method is the conversion of ammonium fluoride into crystaline sodium bifluoride. Development of this method was made possible by the experimental discovery of the proper reacting systems for this conversion.

It was found that exceptionally advantageous conditions for the crystalization of sodium bifluoride exist when a solution which contains hydrofluoric acid and sodium nitrate is used in the reaction with the ammonium fluoride solution. From the point of view of efficiency of crystallization, both solutions should have the highest possible concentration.

A solution of hydrofluoric acid, sodium nitrate and nitric acid of proper composition and of proper concentrations is obtained, according to the invention, from the action of an aqueous solution of nitric acid on solid sodium fluoride or from the action of a solution of ammonium fluoride and nitric acid on soda or sodium nitrate.

By mixing the ammonium fluoride solution with either of the two solutions named previously, which contain hydrofluoric acid and sodium nitrate, sodium bifluoride crystals are precipitated in a very advantageous form for separation from the mother solution.

A solution of ammonium fluoride adequate for the conversion which yields sodium bifluoride may be obtained, according to the invention, from the solution containing potassium fluoride and ammonium fluoride by removal of potassium from it in the form of crystaline potassium nitrate, which is the final product in this complex method. Potassium nitrate is precipitated when ammonium nitrate used in considerable surplus acts on potassium fluoride.

Dried sodium bifluoride, which is the first final product and simultaneously the transitory medium in this complex process, is thermally decomposed to active sodium fluoride and to gaseous hydrogen fluoride.

The three fluorine final products may be obtained in different ratios. This is possible because either product of the thermal decomposition can be used, if required, for the obtaining of the solution of hydrofluoric acid and sodium nitrate applied in the precipitation of sodium bifluoride.

The by-product in this complex method is ammonium nitrate in the form of a concentrated solution. It should be underlined that this method was developed with the assumption that this solution would be utilized as a component of liquid fertilizers.

DETAILED DESCRIPTION OF THE INVENTION

The Method of Obtaining Sodium Bifluoride

Sodium bifluoride, a very reactive compound containing a high percentage of fluorine, should have wide technical application if produced at sufficiently low cost.

This invention makes possible the production of sodium bifluoride in a simple way and with very advantageous technical and economic results from an ammonium fluoride solution, which is easily obtainable from silicofluorine compounds.

The most important result of the invention is the elaboration of a reacting system advantageous for precipitation of sodium bifluoride with high efficiency and in the form of a quickly settling and filtrating precipitate. This reacting system is built up, according to the invention, by the mixing of a concentrated solution of ammonium fluoride with a concentrated solution of sodium fluoride in water and nitric acid or with a concentrated solution of ammonium fluoride and sodium nitrate in water and in nitric acid.

The obtaining of the concentrated solution of sodium fluoride in nitric acid with a concentration up to about 17 equivalents per 1 kg of water, and the obtaining of a solution of sodium nitrate and ammonium fluoride in nitric acid of nearly the same concentration of each compound up to about 15 equivalents per 1 kg of water and the application of these two solutions for the precipitation of sodium bifluoride is of decisive significance in the elaboration of the process. It should be noted that the obtaining of the afore characterized solutions with a very high concentration of fluorine and sodium salts was rather unexpected, especially taking into account the low solubility of sodium fluoride in water. These very high concentrations may be, explained, however, as a result of the synthesis of hydrogen fluoride from hydrogen cations and fluoride anions and as a result of the formation of highly soluble sodium nitrate. Accordingly these solutions may be considered as containing free hydrofluoric acid, sodium nitrate and free nitric acid.

It was found that the advantageous concentration of free nitric acid in the concentrated solution of sodium nitrate and hydrofluoric acid is 2–2.5 equivalents per 1 kg of water. At this range of nitric acid concentration, the concentration of both sodium nitrate and hydrofluoric acid is about 8 equivalents per 1 kg of water at 20° C., about 12 equivalents per 1 kg of water at 50° C. and about 17 equivalents per 1 kg of water at 90° C. It was also found that concentrations of sodium nitrate and hydrofluoric acid close to those given above can be reached in solutions which contain nitric acid with a concentration of 2-2.5 equivalents per 1 kg of water and also ammonium nitrate with such high concentration as 8-12 equivalents per 1 kg of water.

Concentrated solutions containing hydrofluoric acid and sodium nitrate can be easily obtained. The solution containing hydrogen fluoride, sodium nitrate and nitric acid may be obtained by the action of an aqueous solution of nitric acid on solid sodium fluoride. The second solution containing hydrogen fluoride, sodium nitrate, ammonium nitrate and nitric acid may be obtained by the action of a solution containing ammonium fluoride and nitric acid on soda (sodium hydroxide or sodium bicarbonate but preferably sodium carbonate) or sodium nitrate or by the action of a solution containing ammonium nitrate and nitric acid on solid sodium fluoride. The solution containing ammonium nitrate and nitric acid is, in this case, the mother solution, which arose during the precipitation of sodium bifluoride, to which nitric acid is added and the solution which arose during rinsing of sodium bifluoride to which nitric acid was added.

It should be underlined that in the case where the by-production of ammonium nitrate is to be limited, the proper way to obtain the solution of sodium nitrate and hydrofluoric acid is through heating of the solution of ammonium fluoride with soda to form sodium fluoride, evaporation of ammonium carbonate and some amount of water and subsequent dissolution of the dispersed sodium fluoride in nitric acid.

It was found that the solution of sodium nitrate and hydrofluoric acid, together with the crystals which form when the temperature of the solution is lowered, may be reacted with ammonium fluoride under the condition that the slurry is intensively stirred before its introduction into the reactor.

From the chemical and statical point of view, it is proper to increase the concentration of fluorine and sodium in the reacting system by the application of the solution which contains sodium nitrate and hydrofluric acid together with sodium fluoride crystals. It should be noted, however, that the sodium bifluoride formed in this case is partly dispersed, which limit the application of this procedure.

The above mentioned ways of obtaining the solutions for the precipitation of sodium bifluoride make possible the realization of production of sodium bifluoride from ammonium fluoride and sodium fluoride or from ammonium fluoride only.

It is obvious that in the preparation of these solutions containing sodium nitrate, hydrogen fluoride and nitric acid, not only ammonium fluoride and sodium fluoride can be used but also hydrofluoric acid.

The precipitation of sodium bifluoride is based, according to the invention, on the mixing of either of the two afore characterized solutions with the solution of ammonium fluoride. The system resulting from this mixing, reacts according to the equation:

$$NH_4^+ + F^- + HF + Na^+ + NO_3^- = NaHF_2 + NH_4^+ + NO_3^-$$
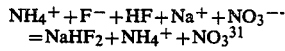

During the operation of mixing, the reacting solutions are gradually introduced in the form of separated equivalent doses or in the form of separated equivalent streams into the intensively stirred mother solution, which contains sodium bifluoride crystals. The mixing of the solutions should be conducted in such a way that high acidity caused by the presence of free nitric acid in one of the two mixed solutions is maintained in the system. This acidity is properly lowered at the end of the process by an additional introduction of ammonium fluoride solution or sodium carbonate during intensive stirring.

Sodium bifluoride precipitate, which arose in the process, settles very quickly, and at the end of sedimentation occupies only a small part of the total volume of the system. The original rate of clarification of the mother solution is very high, up to about 10 meters per 1 hour. The amount of water in the precipitate after centrifugation is very small.

The efficiency of precipitation of sodium bifluoride depends mainly on the concentration of fluorine in the system and on the concentration of sodium cations in the mother solution.

For this reason the reacting system should be built up by using solutions having the highest possible, but technically reasonable, concentration of fluorine. The required concentration of sodium cations can be provided through the addition of sodium nitrate into the system, partly during the introduction of the solutions and partly at the end of the process.

The concentration of fluorine, of about 10 equivalents per 1 kg of water in the reacting system, and concentration of sodium nitrate of about 2 equivalents per 1 kg of water in the mother solution, make possible the precipitation of sodium bifluoride with an efficiency of about 90% when the temperature at the end of the process is 10°-20° C. The reacting system having the afore given fluorine concentration of about 10 equivalents per 1 kg of water, can be built up by using, as a raw material, the ammonium fluoride solution with a concentration of about 10 equivalents per 1 kg of water and the solution of sodium nitrate and hydrofluoric acid of nearly the same concentrations, that is, 10 equivalents per 1 kg of water.

Sodium bifluoride can be precipitated with about 93% efficiency when the fluorine concentration in the system is about 13 equivalents per 1 kg of water, and the concentration of sodium nitrate in the mother solution is about 2 equivalents per 1 kg of water. This system can be built up by using the ammonium fluoride solution at a concentration of about 12 equivalents per 1 kg of water and a solution which contains about 15 equivalents of sodium nitrate and hydrofluoric acid per 1 kg of water.

Ammonium cations and nitric acid participating in the process are fully recovered in the form of an ammonium nitrate solution of concentration 0.4 to 1 kg per 1 kg of water. Concentration of ammonium nitrate depends on the composition of the solution used in the precipitation of sodium bifluoride.

The Method of Obtaining Sodium Bifluoride and Potassium Nitrate

Production of sodium bifluoride and potassium nitrate is based, according to the invention, on the solution of ammonium fluoride and potassium fluoride. This solution can be easily obtained from potassium silicofluoride, the cheapest salt of fluorosilic acid. Fluorine concentration in this solution should be about 12 equivalents per 1 kg of water or more; potassium concentration is ⅓ of this value.

Potassium nitrate crystals are precipitated from this solution by the action of ammonium nitrate and therefore contain some amount of ammonium nitrate. Efficiency of crystalization, which depends on the concentration of potassium and on the temperature, reaches about 80% when the original potassium concentration is 5 equivalents per 1 kg of water and the temperature is 0° C.

The mother solution containing mainly ammonium fluoride, and some amount of ammonium nitrate, potassium nitrate and ammonium bifluoride is, after separation of potassium nitrate crystals, used for the precipitation of sodium bifluoride, according to the afore described method.

The mother solution formed during the precipitation of sodium bifluoride contains as much as 0.6 kg to 1 kg of ammonium nitrate per 1 kg of water. This amount depends on which of the previously described solutions was used to react with ammonium fluoride.

The Method of Obtaining Active Sodium Fluoride and Hydrogen Fluoride

The production of active sodium fluoride and hydrogen fluoride is based on sodium bifluoride as obtained according to the afore described method. This production takes advantage of the known thermal decomposition of this compound and of the possibility of using either product of the thermal decomposition in the reaction in which sodium bifluoride is obtained. Because of this possibility, active sodium fluoride and hydrogen fluroide can be produced in different ratios.

I claim:

1. A method of production of sodium bifluoride from an ammonium fluoride solution, which comprises:
   mixing a concentrated solution of ammonium fluoride with a concentrated solution containing sodium nitrate, hydrofluoric acid and nitric acid, wherein said solutions are introduced into an intensively stirred mother solution which contains sodium bifluoride crystals, such that an agitated reacting system is formed;
   precipitating sodium bifluoride crystals from said mother solution; and
   separating said precipitated sodium bifluoride crystals from said reacting system.

2. The method of claim 1 further characterized in that said concentrated solution of ammonium fluoride and said concentrated solution containing sodium nitrate, hydrofluoric acid and nitric acid are separately introduced in the form of equivalent doses or streams into said intensively stirred mother solution containing crystals of sodium bifluoride.

3. The method of claim 1 further characterized in that the required acidity of said mother solution is obtained by the additional introduction of soda or ammonium fluoride solution into said agitated reacting system.

4. The method of claim 1 further characterized in that the required concentration of sodium nitrate in said mother solution is obtained by the additional introduction of sodium nitrate into said agitated reacting system.

5. The method of claim 1 further characterized in that said concentrated solution containing sodium nitrate, hydrofluoric acid and nitric acid, wherein the amount of sodium nitrate and hydrofluoric acid is less than about 17 equivalents of each compound per 1 kg of water and the amount of nitric acid is more than about 2-2.5 equivalents per 1 kg of water, is obtained by the dissolution of sodium fluoride in an aqueous solution of nitric acid.

6. The method of claim 1 further characterized in that said concentrated solution containing sodium nitrate, hydrofluoric acid and nitric acid is obtained by introducing soda into said concentrated solution of ammonium fluoride, evaporating ammonia or ammonium carbonate and water and dissolving the formed sodium fluoride in nitric acid.

7. The method of claim 1 further characterized in that said concentrated solution containing sodium nitrate, hydrofluoric acid and nitric acid is obtained by introducing nitric acid and soda or sodium nitrate into said concentrated solution of ammonium fluoride.

8. The method of claim 1 further characterized in that said concentrated solution containing sodium nitrate, hydrofluoric acid and nitric acid is obtained by introducing nitric acid and sodium fluoride or soda and hydrofluoric acid into said mother solution from which said sodium bifluoride crystals have been precipitated.

9. The method of claim 1 further characterized in that the temperature of said solutions containing sodium nitrate, hydrofluoric acid and nitric acid is lowered and said solution containing sodium nitrate, hydrofluoric acid and nitric acid, together with the crystals formed as a result of the lowering of the temperature are applied in the form of an intensively stirred slurry to the reaction with said ammonium fluoride solution.

10. The method of claim 9 further characterized in that said solutions containing sodium nitrate, hydrofluoric acid and nitric acid and said slurry together with added crystals of sodium nitrate and sodium fluoride are applied in the form of an intensively stirred slurry to the reaction with said ammonium fluoride solution.

11. A method as set forth in claim 1 further adapted to produce potassium nitrate and sodium bifluoride, wherein a solution of potassium fluoride and ammonium fluoride is obtained from potassium silicofluoride, said potassium nitrate is precipitated from said potassium fluoride and ammonium fluoride solution by the action of ammonium nitrate and by cooling the reacting system, said precipitated potassium nitrate crystals are separated from the mother solution and said mother solution is utilized for the precipitation of said sodium bifluoride.

12. The method of claim 1 further characterized in that said reacting system is cooled to about 0° C.

13. The method of claim 1 further characterized in that said sodium bifluoride is subject to thermal decomposition with partial recycling of one of the products of said thermal decomposition to the preparation of a concentrated solution of sodium fluoride in nitric acid for the purpose of producing said sodium fluoride and said hydrogen fluoride in different ratios.

14. The method of claim 1 further characterized in that a concentrated solution of ammonium nitrate, which contains sodium nitrate as a by product, is formed in the reaction in which said sodium bifluoride is precipitated.

* * * * *